United States Patent [19]
Otani et al.

[11] 4,426,962
[45] Jan. 24, 1984

[54] STRUCTURE FOR FACILITATING STARTING AND WARMING OF INTERNAL COMBUSTION ENGINES

[75] Inventors: Junji Otani, Oomiya; Akira Okubo; Takashi Kushibiki, both of Tokyo, all of Japan

[73] Assignee: Honda Giken Kogyo Kabushiki Kaisha, Tokyo, Japan

[21] Appl. No.: 367,355

[22] Filed: Apr. 12, 1982

[30] Foreign Application Priority Data

Apr. 13, 1981 [JP] Japan .................................. 56-55271

[51] Int. Cl.³ .............................................. F02M 1/08
[52] U.S. Cl. .................................... 123/179 H; 123/3; 123/549; 123/557; 261/142
[58] Field of Search ................... 123/3, 585, 557, 558, 123/179 H, 180 E, 549; 261/39 D, 142, DIG. 8

[56] References Cited

U.S. PATENT DOCUMENTS

| | | | |
|---|---|---|---|
| 2,087,792 | 7/1937 | Beals | 261/142 |
| 3,975,468 | 8/1976 | Tuckey | 123/52 M |
| 3,978,836 | 9/1976 | Noguchi et al. | 123/179 H |
| 4,387,676 | 6/1983 | Coucerro | 123/179 H |

*Primary Examiner*—William A. Cuchlinski, Jr.
*Attorney, Agent, or Firm*—Armstrong, Nikaido, Marmelstein & Kubovcik

[57] ABSTRACT

A structure for facilitating the starting and warming of an internal combustion engine provided with a carburetor in its intake passage. A side passage which is separate from the intake passage by-passes a throttle valve in the carburetor is connected to the intake passage. A fuel nozzle capable of injecting fuel into the side passage and a control valve adapted to open and close the side passage are also provided. A heating chamber is formed in the side passage on the downstream side of the control valve. A heating element adapted to heat a gaseous mixture generated in the side passage to turn the gaseous mixture into a combustible gaseous mixture is accommodated in the heating chamber. The structure may further include a heat insulating member inserted between the heating chamber and carburetor and/or intake passage. Further, the structure may include a secondary air passage, a fuel injection unit for injecting fuel into the heating chamber and a catalytic converter in the heating chamber.

7 Claims, 12 Drawing Figures

STRUCTURE FOR FACILITATING STARTING AND WARMING OF INTERNAL COMBUSTION ENGINES

BACKGROUND OF THE INVENTION

1. Field of the Invention

This invention relates to a structure for facilitating the starting and warming of internal combustion engines provided with a carburetor in the main intake passage.

2. Description of the Prior Art

When alcohol, which has a high heat of vaporisation and a low vapor pressure, is used as fuel for an internal combustion engine, it is difficult to generate a combustible gaseous mixture by an ordinary carburetor alone, especially at low temperatures. This poses problems in startability and warming stability of the engine. There is a known structure of this kind in which a heating element such as an electric heater is disposed on the downstream side of the carburetor and adapted to heat the gaseous mixture. When the engine is started at a low temperature, a gaseous mixture generated in the carburetor is heated by the heating element to convert it into a combustible gaseous mixture, and thereby facilitate starting and warming of the engine. In this structure, however, the heating element causes intake resistance during normal engine operation, making it difficult to obtain full engine performance.

SUMMARY OF THE INVENTION

An object of the present invention is to provide a structure for facilitating starting and warming of the above-mentioned kind of internal combustion engines, which is free from the above-mentioned drawbacks encountered in the conventional structure of this kind, and which is capable of facilitating starting and warming of the engine even when fuel having a high heat of vaporisation and a low vapor pressure is used.

Another object of the present invention is to provide a simple and useful structure of this kind which can effectively facilitate starting and warming of an engine with a small quantity of heat even when a fuel having a high heat of vaporisation and a low vapor pressure is used.

To these ends, the present invention provides a structure for facilitating starting and warming of internal combustion engines, comprising an intake passage, a carburetor fitted to the intake passage and having a throttle valve therein, a side passage connected to the intake passage and by-passing the throttle valve, a fuel nozzle for supplying fuel into the side passage, a control valve for opening and closing the side passage, a heating chamber formed in the side passage on the downstream side of the control valve, and a heating element provided in the heating chamber and adapted to heat a gaseous mixture which is produced in the side passage and thereby convert it into a combustible gaseous mixture.

The above and other objects, features, and advantages of the invention will become apparent from the following detailed description of several preferred embodiments when taken in conjunction with the accompanying drawings.

BRIEF DESCRIPTION OF THE DRAWINGS

FIGS. 1 and 2 illustrate a first embodiment of the present invention, wherein:

FIG. 1 is a side elevational view in longitudinal section of a principal portion; and FIG. 2 is a sectional view taken along the line II—II in FIG. 1;

FIGS. 6 and 7 illustrate a fifth embodiment of the present invention, wherein:

FIG. 6 is a side elevational view in longitudinal section of a principal portion; and FIG. 7 is a sectional view taken along the line VII—VII in FIG. 6;

FIGS. 8 and 9 illustrate a sixth embodiment of the present invention, wherein:

FIG. 8 is a side elevational view in longitudinal section of a principal portion; and FIG. 9 is a sectional view taken along the line IX—IX in FIG. 8;

FIGS. 10 and 11 illustrate a modified form of a heating cylinder as shown in FIGS. 8 and 9, wherein:

FIG. 10 is a sectional view of the heating cylinder similar to FIG. 9; and

FIG. 11 is a sectional view taken along the line XI—XI in FIG. 10; and

DESCRIPTION OF THE PREFERRED EMBODIMENTS

Figure 1:
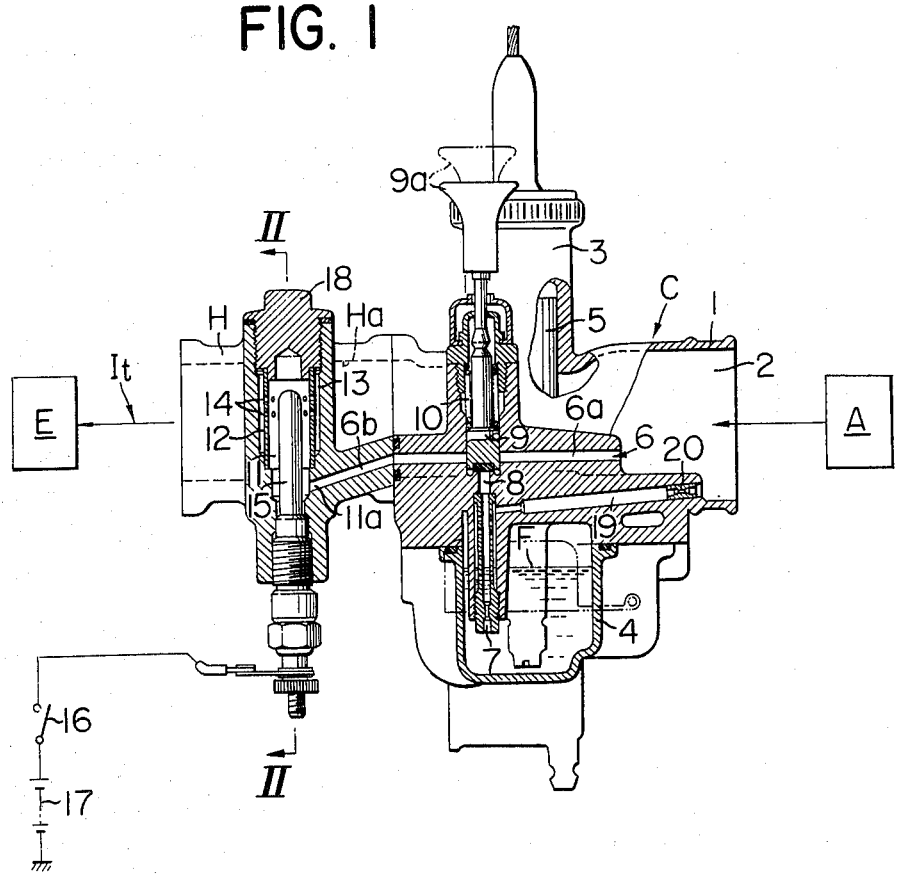

Several embodiments of the present invention will be described with reference to the accompanying drawings. In the following description and accompanying drawings, the same or equivalent parts are designated by the same reference numerals or letters.

Figure 2:
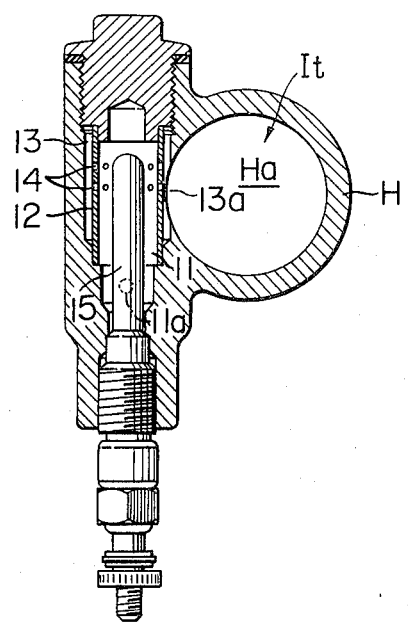

FIGS. 1 and 2 illustrate a first embodiment of the present invention. Reference letters It denote an intake passage connecting a spark ignition type internal combustion engine E to an air cleaner A for cleaning the intake air. A carburetor C and a heating cylinder H are inserted into portions of the suction passage It spaced from its ends. The body 1 of the carburetor C has a horizontal intake passage 2 connected to a hollow portion Ha of the heating cylinder H, which is joined to the internal combustion engine E. A throttle valve guide cylinder 3 and a float chamber 4 are formed on opposite sides of the intake passage 2, i.e. the guide cylinder 3 is formed in an upper portion of the carburetor body 1, and the float chamber 4 in a lower portion thereof. A piston type throttle valve 5 for opening and closing the suction passage 2 is slidably fitted in the throttle valve guide cylinder 3. The fuel alcohol F is stored in the float chamber 4. Various types of fuel nozzles are open in the intake passage 2, which nozzles are adapted to eject the fuel in the float chamber 4 into the intake passage 2 in accordance with the load conditions for the engine E. Since these nozzles have known constructions, descriptions thereof will be omitted.

A side passage 6, whose diameter is far smaller than that of the intake passage 2, is continuously formed in the carburetor body 1 and heating cylinder H. The side passage 6 by-passes the throttle valve 5 and opens at one end thereof into the intake passage 2 and at the other end thereof into the hollow portion Ha of the heating cylinder H. A fuel nozzle 8, which opens into the fuel in the float chamber 4 via a fuel jet 7, opens in an upstream portion 6a of the side passage 6, which passes through the carburetor C, and a piston type control valve 9 adapted to open and close the opening of the nozzle 8 and the side passage 6 is provided in the portion 6a. The upper end of the control valve 9 is provided with a knob 9a for opening and closing it, and is constantly urged in the closing direction by a spring 10.

A cylindrical heating chamber 11 and an annular chamber 13 which surrounds the upper half portion of the heating chamber 11 via a cylindrical partition 12 are formed in a downstream portion 6b of the side passage 6, which passes the heating cylinder H. These chambers 11, 13 are communicated with each other via a plurality of through bores 14 provided in the cylindrical wall of the partition 12. The heating chamber 11 has at a lower portion thereof an inlet 11a for introducing thereinto a gaseous mixture from the side passage 6 upstream of the heating chamber 11. The annular chamber 13 has at one side thereof an outlet 13a for opening the chamber 13 into the suction chamber 2. A rod type heating element 15 extends uprightly into the heating chamber 11, passes a front side of the inlet 11a, and is fixed with a screw in the heating cylinder H. In the embodiment shown, the heating element 15 consists of an electric heater, and is connected to the battery 17 via a switch 16.

The heating chamber 11 and annular chamber 13 are closed at their respective upper ends with a cap 18 screwed to the heating cylinder H, and the cylindrical partition 12 is held at an upper end thereof on the cap 18. Accordingly, when the cap 18 is removed, the cylindrical partition 12 can be withdrawn upward, and washed easily.

Referring to the drawings, reference numeral 19 denotes an air introduction passage for air bleeding to emulsify the fuel flowing upward in the fuel nozzle 7, and 20 is an air jet for passage 19.

The operation of this embodiment will now be described. In order to start the engine E, which is cold, the switch 16 is first closed to apply an electric current to the heating element 15 and heat it. The control valve 9 is then drawn upward with the throttle valve 5 closed, to open the side passage 6 and fuel nozzle 8. When the engine E is then cranked, air filtered in the air cleaner A is drawn into the side passage 6. At the same time, the fuel F in the float chamber 4 is ejected from the fuel nozzle 8 metered by the fuel jet 7, due to the vacuum in the side passage 6. The resulting gaseous mixture consisting of air and fuel flows into the heating chamber 11 from the inlet 11a thereof to advance upward along the length of the outer circumferential surface of the heating element 15. The gaseous mixture is thus effectively heated. As the gaseous mixture is heated in this manner, a part of it burns to thereby further heat the remainder. The gaseous mixture thus rendered combustible flows through the bores 14 in the cylindrical partition 12 as the flames are stifled therein, into the annular chamber 13. The gaseous mixture then flows out from the outlet 13a into intake pipe Ea, to be drawn into the combustion chamber in the engine E. The resulting gaseous mixture burns easily when it is ignited by a spark in the combustion chamber, starting the engine E.

Since the inlet 11a, which is communicated with an upstream portion of the side passage 6, and a plurality of small bores 14, which are communicated with a downstream portion thereof, are provided at both end portions of the heating chamber 11, and the heating element 15 is disposed to extend from the inlet 11a to the small bores 14, the length of time during which the gaseous mixture flows from the inlet 11a to the small bores 14 or passes through the heating chamber and the length of time during which the gaseous mixture is in contact with the heating element 15 can be set to sufficiently high levels. Accordingly, the gaseous mixture can be heated effectively. Moreover, when the gaseous mixture passes through the small bores 14, flames in the parts of the gaseous mixture which have begun to burn in the heating chamber 11 can be stifled. Consequently, even when the quantity of heat generated by the heating element 15 is small, it can be utilized efficiently to obtain a combustible gaseous mixture.

When the control valve 9 continues to be opened after the engine has been started, the combustible gaseous mixture continues to be supplied from the side passage 6 to the engine E, so that operation to warm the engine E is promoted. In this stage of operation of the engine, the gaseous mixture generated in the side passage 6 can be diluted suitably with the gaseous mixture which has been generated in the intake passage 2 by suitably regulating the opening of the control valve 9 and throttle valve 5.

After the engine E has been heated to a suitable temperature by the above-described engine-warming operation, control valve 9 is closed and switch 16 is opened to turn off the heating element 15. As a result, the combustible gaseous mixture is no longer supplied from the side passage 6 to the engine E. However, the warmed engine E can operate continuously with supply of the gaseous mixture generated in the intake passage 2, in the same manner as in normal operation.

Figure 3:
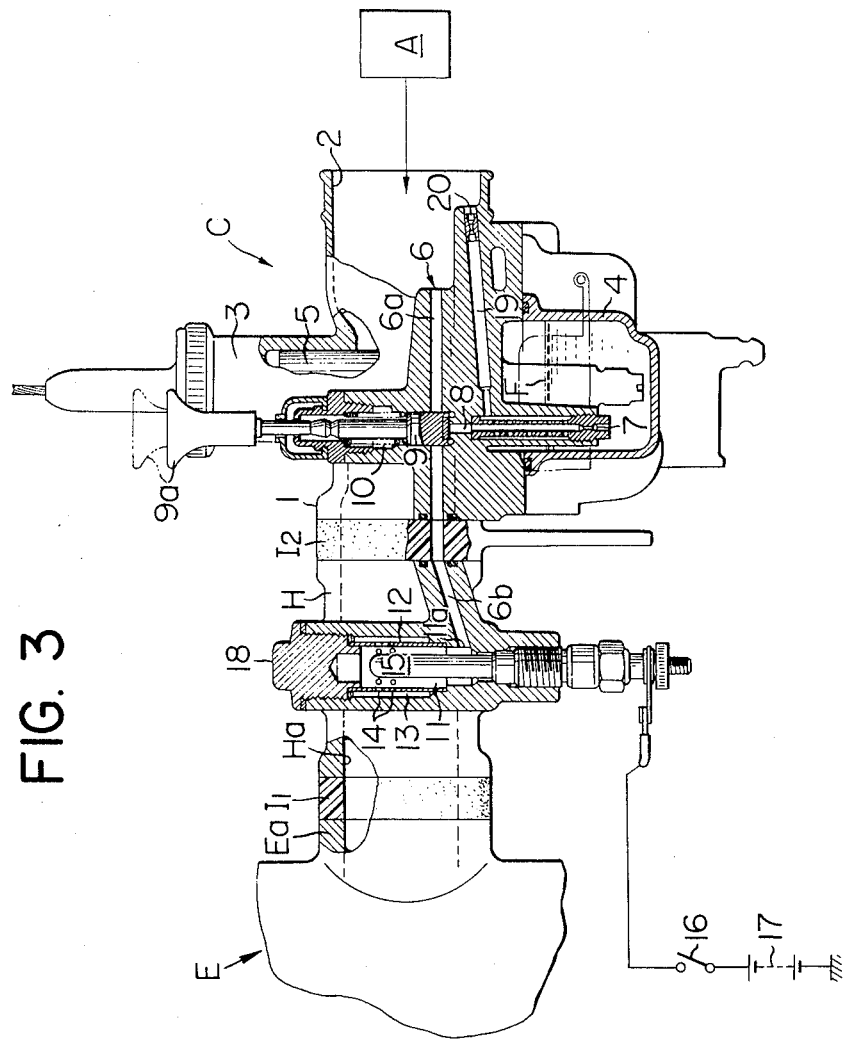
FIG. 3 is a view similar to FIG. 1, illustrating a second embodiment of the present invention.

FIG. 3 illustrates a second embodiment of the present invention. In this embodiment, annular heat insulating members $I_1$, $I_2$ are inserted between the heating cylinder H and at least one of adjacent members of the intake pipe Ea for the engine E and carburetor body 1, preferably both of these adjacent members as in the embodiment shown in the drawing. In this arrangement, the heat generated in the heating chamber 11 of the heating cylinder H is not transmitted to the engine E and carburetor C owing to the heat insulating members $I_1$, $I_2$. Accordingly, the heat is efficiently accumulated in the heating cylinder H which has a comparatively small heat capacity, and the gaseous mixture is heated effectively. Those portions of the construction and operation of this second embodiment which are not described above are the same as the corresponding portions of the construction and operation of the first embodiment.

Figure 4:
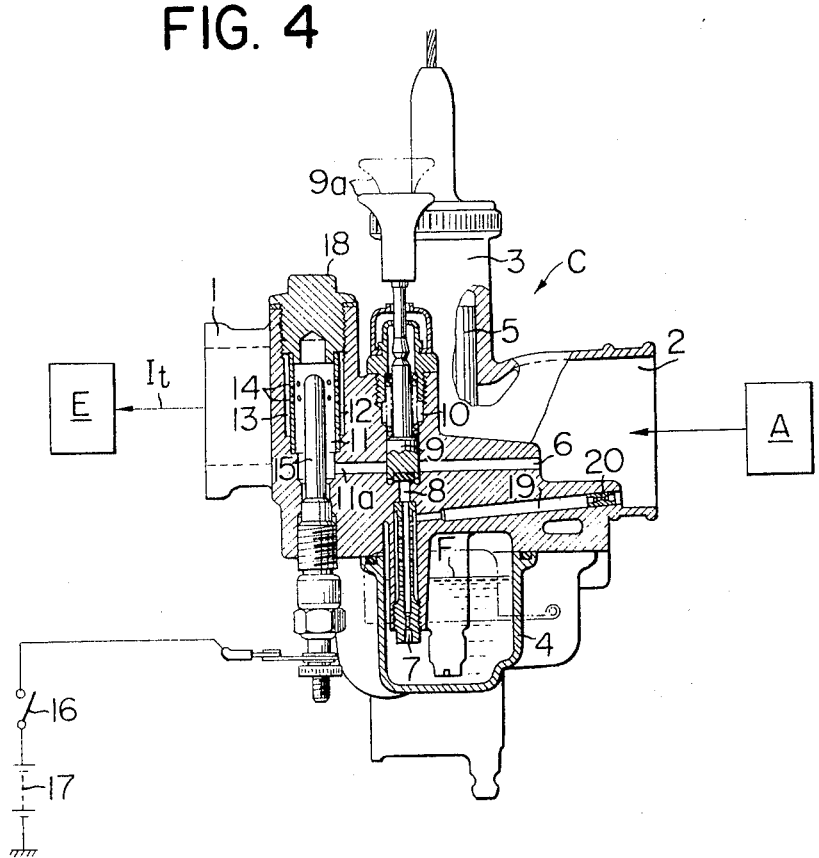
FIG. 4 is a view similar to FIG. 1, illustrating a third embodiment of the present invention.

FIG. 4 illustrates a third embodiment of the present invention. In this embodiment, both the side passage 6 and heating chamber 11 are formed in the carburetor body 1. Accordingly, the side passage 6 having the heating chamber 11 can be formed with a small length and diameter, so that a combustible gaseous mixture can be generated by effectively heating or burning the gaseous mixture generated in the side passage 6 by the heating element 15 of a relatively small capacity. Owing to the generation of heat by the heating element 15 in the heating chamber 11 and accompanied combustion of the gaseous mixture, each part of the carburetor C is heated so that the fuel and air therein can be preheated. Those portions of the construction and operation of this embodiment which are not described above are substantially the same as the corresponding portions of the construction and operation of the first embodiment.

Figure 5:
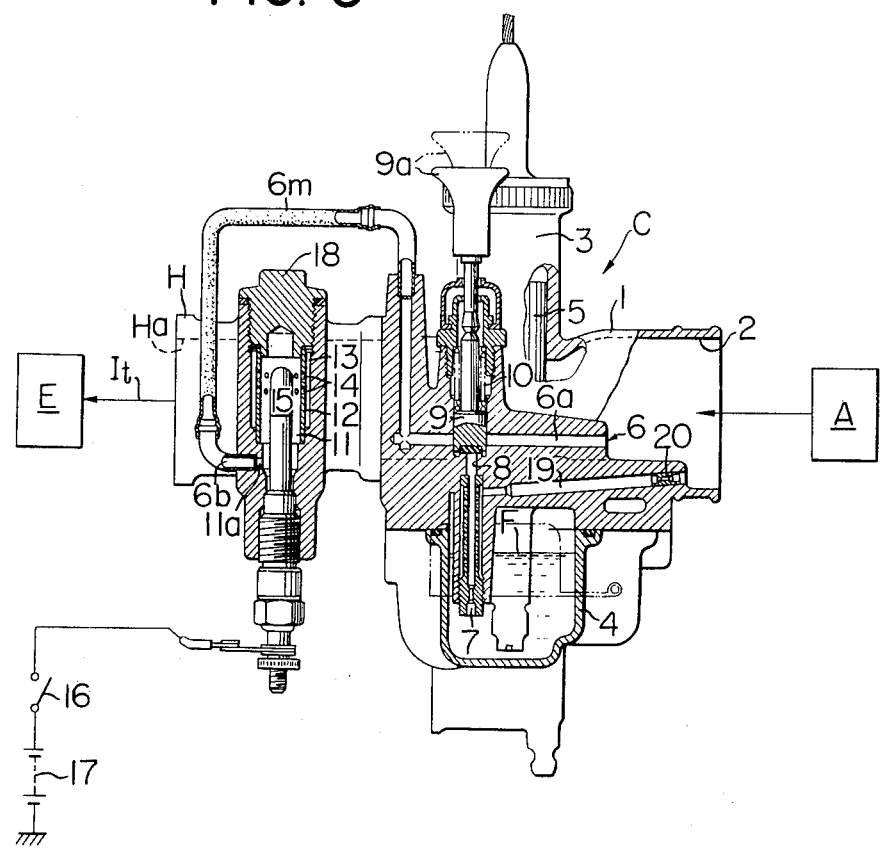
FIG. 5 is also a view similar to FIG. 1, illustrating a fourth embodiment of the present invention.

FIG. 5 illustrates a fourth embodiment of the present invention. This embodiment is substantially identical with the first embodiment except that the upstream portion 6a of the side passage 6, which is formed in the carburetor body 1, and its downstream portion 6b, which is formed in the heating cylinder H, are connected together by a conduit 6m provided outside the carburetor 1 and heating cylinder.

Figure 6:
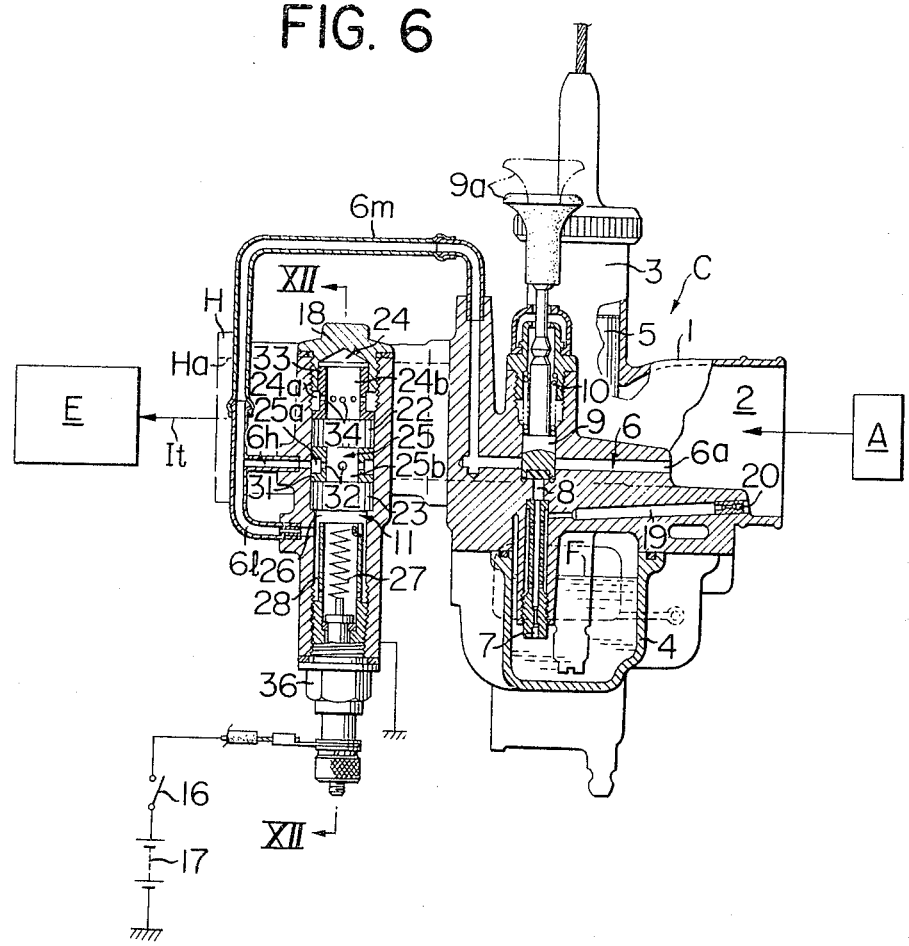
Figure 7:
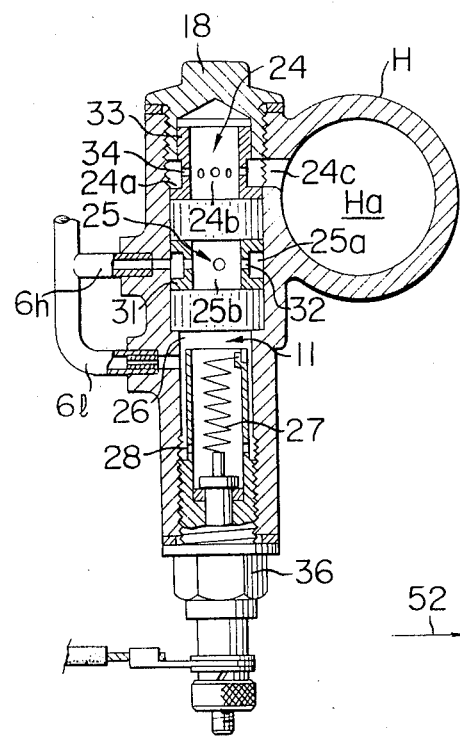

FIGS. 6 and 7 illustrate a fifth embodiment of the present invention. This embodiment is different from the first embodiment shown in FIGS. 1 and 2 and the fourth embodiment shown in FIG. 5 in the construction of the side passage 6 including the heating chamber 11. Namely, in this fifth embodiment, the heating chamber 11 is formed at the downstream portion of the side passage 6 passing through the heating cylinder H. The heating chamber 11 is divided into an upper chamber 24, an intermediate chamber 25 and a lower chamber 26 by upper and lower catalytic converters 22, 23 accommodated therein. An intermediate portion 6m of the side passage 6, which is connected to the upstream portion 6a thereof in the carburetor body 1, is joined via upper and lower branch passages 6h, 6l thereof to the intermediate and lower chambers 25, 26, respectively. One side of the upper chamber 24 is provided with an outlet 24c, which is communicated with the hollow portion Ha of the heating cylinder H.

A heating element 27 is provided in the lower chamber 26 and covered with a cylindrical enclosure 28 so as not to be cooled by the gaseous mixture flowing from the lower branch passage 6l. In the embodiment shown in the drawings, the heating element 27 consists of an electric heater, and is connected to the battery 17 via a switch 16.

A cylinder 31 having flanges at both its ends and a plurality of through bores 32 in its circumferential wall is fitted in the intermediate chamber 25 thereby dividing chamber 25 into an annular outer chamber 25a which is connected to the upper branch passage 6h, and an inner chamber 25b which extends between the upper and lower catalytic converters 22, 23. A cylinder 33 having flanges at both its ends and a plurality of small bores 34 in its circumferential wall is fitted in the upper chamber 24, thereby dividing chamber 24 into an annular outer chamber 24a continuous with the outlet 24c, and an inner chamber 24b defined by the upper surface of the upper catalytic converter 22.

An upper end of the heating chamber 11 is closed with an upper cap 18 screwed to the heating cylinder H. When the cap 18 is removed, the cylinders 31, 33 and catalytic converters 22, 23 can be withdrawn upward. The lower end of heating chamber 11 is also closed with a lower cap 36 screwed to the heating cylinder H. When the cap 36 is removed, the heating element 27 and cylindrical enclosure 28 can be withdrawn downward unitarily with the cap 36.

The operation of this embodiment will now be described. In order to start the engine when it is cold, the switch 16 is first closed to pass electric current through the heating element 27 and generate heat therein. The cylindrical enclosure 28 and lower catalytic converter 23 are heated with this heat to activate the catalytic converter 23.

The control valve 9 is then lifted as shown by the chain line, with the throttle valve 5 closed, to open the side passage 6 and fuel nozzle 8. When the engine E is then cranked, air filtered by the air cleaner A is drawn into the side passage 6. Fuel F in the float chamber 4 is ejected from the fuel nozzle 8 due to the vacuum in the side passage 6 while being metered by fuel jet 7. The gaseous air-fuel mixture is distributed from the branch passages 6h, 6l to the intermediate and lower chambers 25, 26 in the heating chamber 11.

The gaseous mixture entering the lower chamber 26 comes into contact with the hot cylindrical enclosure 28 thereby to be heated. The resulting gaseous mixture flows into the lower catalytic converter 23 to start burning with the reaction heat. The gaseous mixture thus becomes a high-temperature gaseous mixture containing a combustion gas. The hot gaseous mixture then flows into the inner chamber 25b of the intermediate chamber 25, in which it is mixed with a gaseous mixture flowing from the outer chamber 25a thereinto through the bores 32, and this latter gaseous mixture is heated. The resulting gaseous mixture enters the upper catalytic converter 22 in which the gaseous mixture as a whole is further heated by the reaction heat and then flows into the inner chamber 24b of the upper chamber 24. Thus, a part of the gaseous mixture turns into a combustion gas while the greater part thereof becomes a combustible gaseous mixture and then passes through the small bores 34, which stifles the flames to enter the outer chamber 24a, flowing from the outlet 24c into the intake passage It to be drawn into the cylinder in the engine E. When this gaseous mixture is ignited, it burns easily to start the engine. Therefore, even when alcohol, which has a high heat of vaporization and a low vapor pressure, is used as a fuel, an excellent combustible gaseous mixture can be obtained with a comparatively small quantity of heat generated by the heating element. Especially, when a battery is used as a heat source for the heating element, the power consumption can be reduced so that this apparatus can be effectively used for miniature vehicles.

In the above embodiment, upper and lower catalytic converters 22, 23 are provided. However, when the lower catalytic converter 23 alone supplies sufficient reaction heat to the gaseous mixture, the upper catalytic converter 22 can be omitted.

Figure 9:
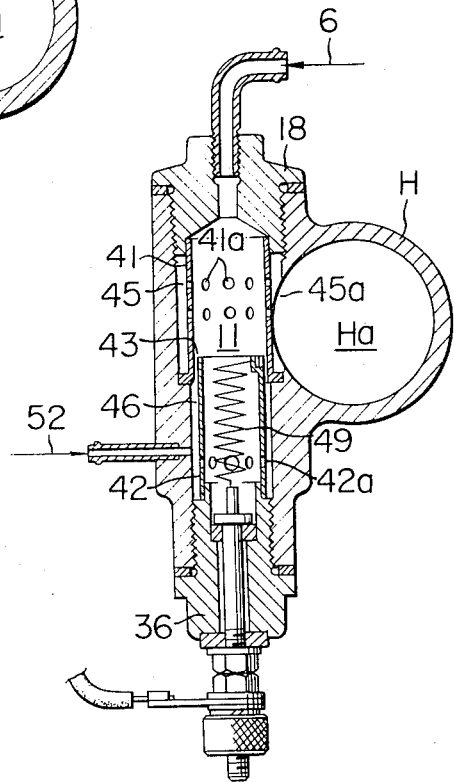
Figure 8:
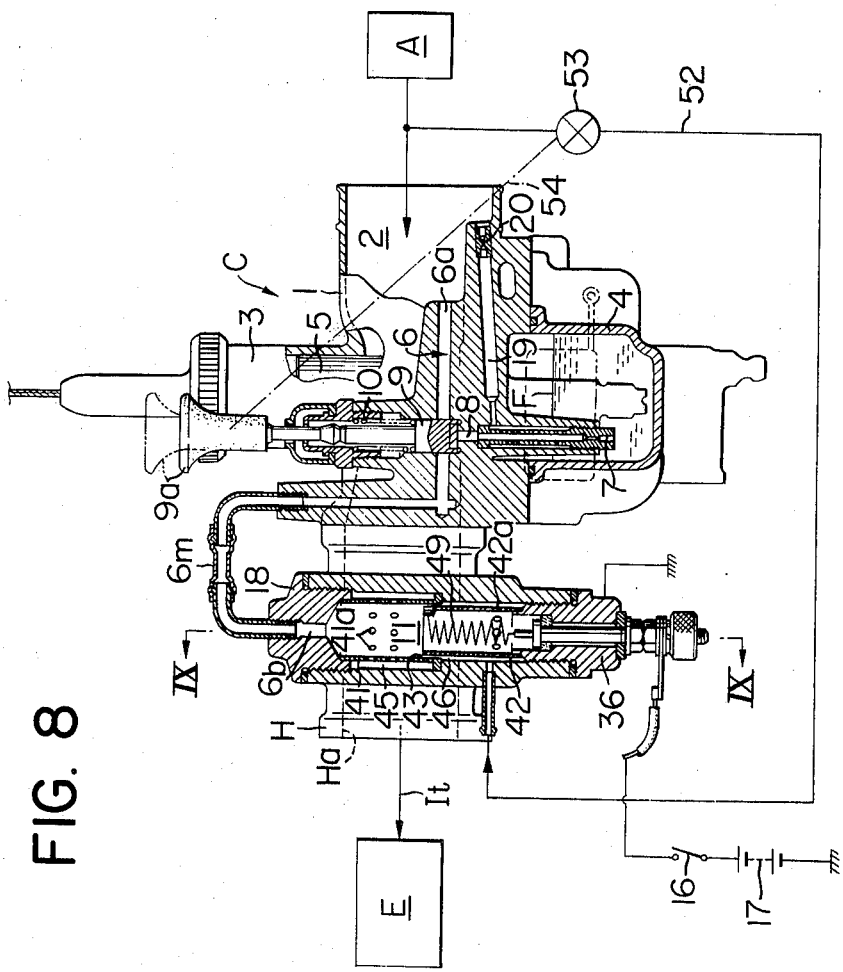

FIGS. 8 and 9 illustrate a sixth embodiment of the present invention. In this embodiment, the upstream portion 6a of the side passage 6, which is formed in the carburetor body 1, and its downstream portion 6b, formed in the heating cylinder H, are connected to each other via a conduit 6m provided outside the carburetor body 1 and heating cylinder H. An upper combustion cylinder 41 and a lower combustion cylinder 42 are provided in the downstream portion 6b of the side passage 6. Lower combustion cylinder 42 is inserted into an inner peripheral portion of the lower end of the upper combustion cylinder 41 with an annular clearance 43 formed therebetween. The inside of these combustion cylinders 41, 42 defines a heating chamber or combustion chamber 11. These upper and lower combustion cylinders 41, 42 further define at outside portions thereof an annular chamber 45 for a combustible gaseous mixture and a secondary air chamber 46, respectively. The interior and exterior of the upper combustion cylinder 41 are communicated with each other via a plurality of small bores 41a provided in the circumferential wall of cylinder 41. The interior and exterior of the lower combustion cylinder 42 are also communicated with each other via a plurality of through bores 42a provided in its circumferential wall. The secondary air chamber 46 and an upper portion of the combustion chamber are also communicated with each other via the clearance 43. The upper portion of the combustion chamber 11, i.e. the interior of the upper combustion cylinder 41, is communicated with an upstream portion of the side passage 6, while the chamber 45 for a combustible gaseous mixture is communicated via an outlet 45a with that portion of the suction passage 2 which is in the heating cylinder H. A heating element 49 is provided in a lower portion of the combustion chamber 11, i.e. the interior of the lower combustion cylinder 42. In the embodiment shown in the drawings, the heating element 49 consists of an electric heater, and is connected to the battery 17 through a switch 16.

The secondary air chamber 46 is connected via a secondary air passage 52 to the upstream side of the throttle valve 5, i.e., a communication passage between the intake passage 2 and air cleaner A in the embodiment shown in the drawings. The secondary air passage 52 is provided with an air valve 53 for opening and closing it. The air valve 53 is connected via a suitable interlocking mechanism 54 to the control valve 9 in the side passage 6, and is adapted to be opened and closed in accordance with the operation of the control valve 9.

The operation of this embodiment will now be described. In order to start the engine E when it is cold, the switch 16 is first closed to pass electric current through the heating element 49 and thereby heat it. The control valve 9 is then pulled upward as shown by the chain line to open the side passage 6 and fuel nozzle 8, and thus the air valve 53 in accordance with it. When the engine E is then cranked, air filtered in the air cleaner A is drawn into the side passage 6 and the fuel F in the float chamber 4 is ejected from fuel nozzle 8 due to the vacuum in the side passage while being metered by fuel jet 7. The resulting gaseous air-fuel mixture flows into the combustion chamber 11 from an upper portion thereof, and the fuel in the gaseous mixture, particularly in the form of droplets, flows down around heating element 49.

A part of the air which has passed through the air cleaner A is also drawn into the secondary air passage 52 to be introduced into the secondary air chamber 46. This air is separated into two branches in the secondary chamber 46, flowing in different directions. That is, a part of the air flows through the bores 42a into the lower combustion cylinder 42, and the other part flows through the clearance 43 into the upper combustion cylinder 41. The former air is mixed with the above-mentioned fuel droplets in the lower combustion cylinder 42 to form a gaseous mixture which is heated with the heating element 49 to start burning. The latter air serves to properly regulate the air-fuel ratio of the gaseous mixture in the upper combustion cylinder 41, and increase the flame produced in the lower combustion cylinder 42. The greater part of the gaseous mixture is heated with this flame. Dividing the air into two branches in the secondary air chamber 46 to supply it in two directions as described above is effective to reduce the flow rate of the air to be supplied to the lower combustion cylinder 42 to the lowest possible level for igniting the fuel droplets, and thereby preventing the secondary air from cooling the heating element 49.

The greater part of the gaseous mixture is thus mixed with a part of the combustion gas in the combustion chamber 11 without burning, to be effectively heated and converted into a combustible gaseous mixture then flows through the small bores 41a which stifle the flames therein, and flows out of the outlet 45a into the intake passage It to be drawn into the cylinder in the engine E. When this combustible gaseous mixture is ignited by a spark, it burns easily to start the engine E.

In the above embodiment, the air valve 53 in the secondary air passage 52 can be substituted by an orifice.

Figure 10:
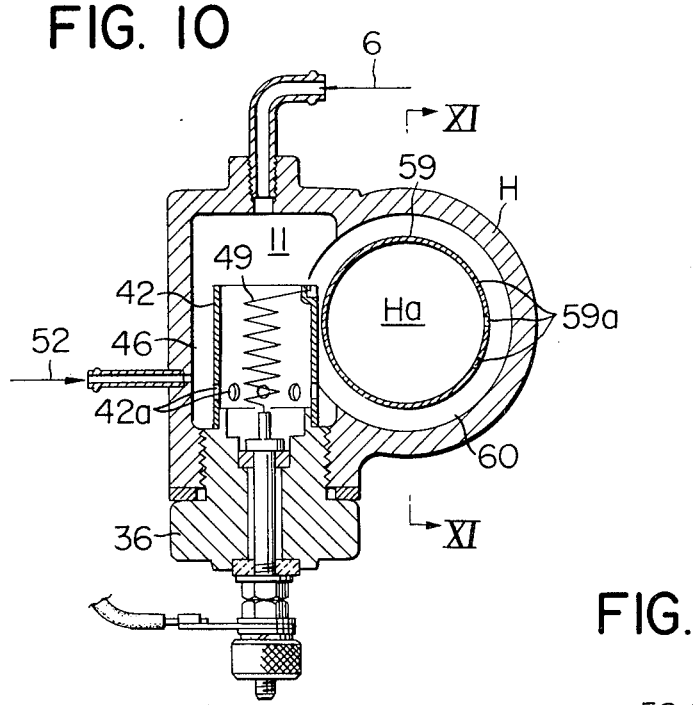
Figure 11:
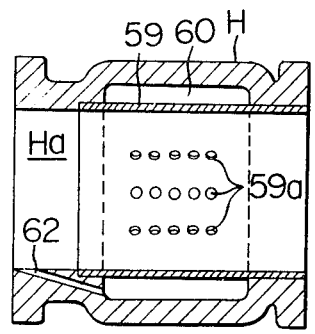

FIGS. 10 and 11 illustrate a modified form of the sixth embodiment shown in FIGS. 8 and 9. In this modified form, a thin-wall pipe 59 is provided in the heating cylinder H such that the pipe 59 forms a part of the inner surface of the heating cylinder. An annular passage 60 is formed outside of the outer circumferential surface of the thin-wall pipe 59. The annular passage 60 is communicated directly with an upper portion of the combustion chamber 11. The annular passage 60 is also communicated with the inner side of the thin-wall pipe 59, i.e. the suction passage Ha via a plurality of small bores 59a provided in that portion of the thin-wall pipe 59 on the opposite side of the combustion cylinder 42. The annular passage 60 is further communicated at its bottom portion with a downstream portion of the suction passage Ha via an ejection bore 62. The remaining parts of the construction of this modified example are substantially identical with the corresponding parts of the construction of the sixth embodiment.

A combustion gas and a gaseous mixture are mixed with each other to form a combustible gaseous mixture in the combustion chamber 11 in the same manner as in the fifth embodiment, and this combustible gaseous mixture flows into the annular passage 60 to heat the thin-wall pipe 59 and then passes through the small bores 59a in which the mixture is stifled the flames. The resulting gaseous mixture flows into the suction passage Ha, and is then drawn into the engine E in the same manner as in the sixth embodiment to promote starting and warming of the engine. The thin-wall pipe 59 is heated to a high temperature by the combustible gaseous mixture passing through the annular passage 60 during this operation. Accordingly, when the engine E is shifted from warming operation to normal operation, the gaseous mixture generated in the intake passage 2 in the carburetor C is heated by the high-temperature thin-wall pipe 59 as the gaseous mixture passes through it. This allows the gaseous mixture to be burnt more easily in the engine E. Therefore, the warming operation of the engine E can be shifted smoothly to normal operation.

When liquid fuel collects in the bottom portion of the annular passage 60 during engine starting and warming operations, it is drawn into the engine E due to the suction vacuum therein mainly during normal operation to be ejected from the ejection bore 62 and supplied to the engine E with the gaseous mixture.

Figure 12:
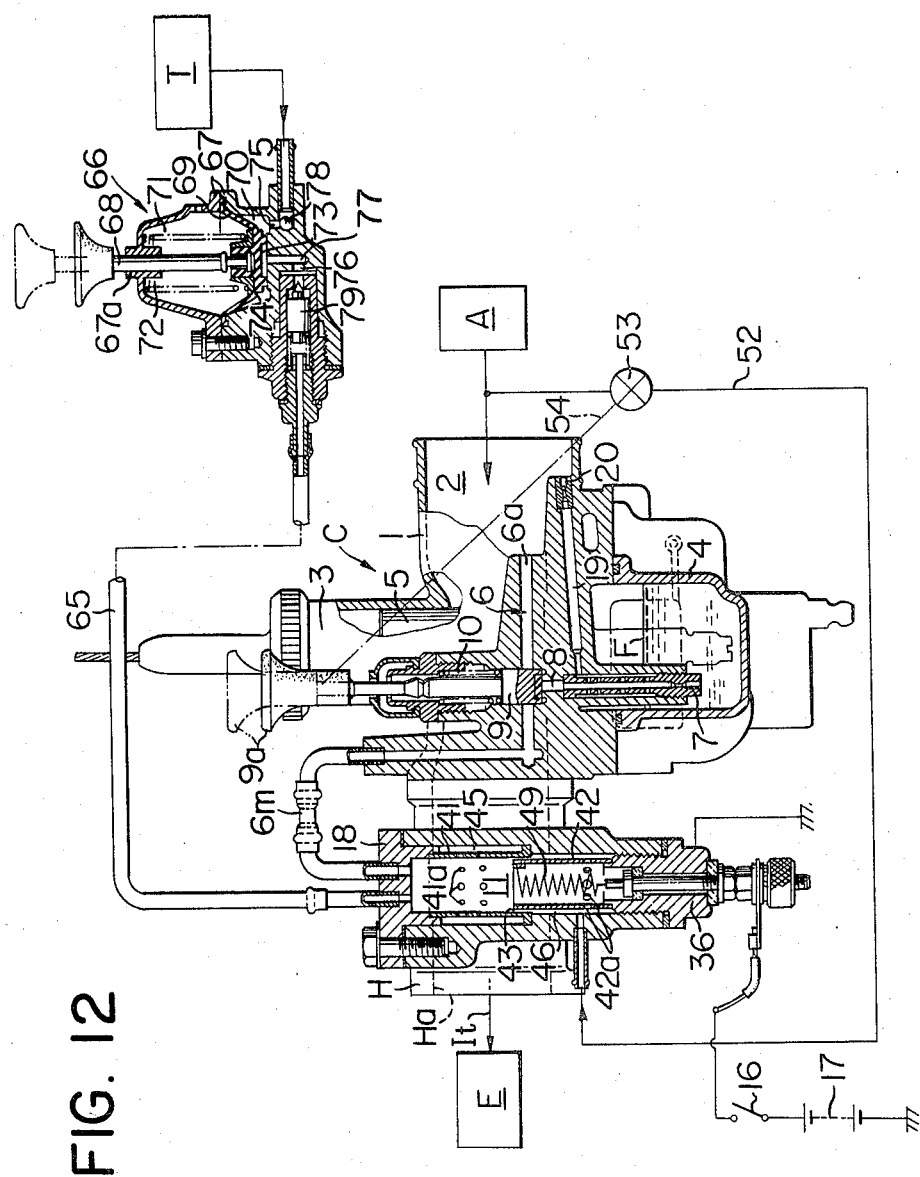
FIG. 12 is a side elevational view of a seventh embodiment of the present invention, illustrating a principal portion thereof.

FIG. 12 illustrates a seventh embodiment of the present invention. In this embodiment, the fuel tank T is connected to the heating chamber or combustion chamber 11 via a fuel passage 65. A fuel injection unit, i.e. a manual fuel pump 66 which is capable of injecting a predetermined amount of fuel from the fuel tank T into the combustion chamber 11, is provided at an intermediate portion of the fuel passage 65. This embodiment is substantially identical with the embodiment shown in FIGS. 8 and 9 except for the above-mentioned points.

The fuel pump 66 has a pump body 67, the interior of which is divided into a pump chamber 70 and an atmospheric chamber 71 by a diaphragm 69 connected with an operation rod 68. A return spring 72 which urges the diaphragm 69 toward the pump chamber 70 is provided in the atmospheric chamber 71. The operating rod 68 is slidably supported in a boss 67a formed in an upper end wall of the pump body 67, and is restricted thereby its drawing stroke. The operating rod 68 is provided thereon with a valve body 73, which is fitted on the diaphragm 69, and a valve seat 74 cooperating with the valve body 73 is formed in a lower end wall of the pump chamber 70. An inlet port 75 and an outlet port 76 open in those portions of the inner surface of the pump chamber 70 at the respective sides of the valve seat 74. The pump chamber 70 is communicated with an upstream side of the fuel passage 65 via the inlet port 75, and with the downstream side thereof via the outlet port 76.

The fuel pump 66 includes an intake valve 78 and a discharge valve 79 which are provided in the inlet port 75 and outlet port 76, respectively. The intake valve 78 is a normally-open valve.

The fuel tank T may be replaced by any fuel tank adapted to store fuel to be supplied to the float chamber 4.

In order to start the engine E when it is cold, first the fuel pump 66 is operated. Namely, the operating rod 68 is drawn as shown by the chain line to remove the valve body 73 from the valve seat 74 with the diaphragm 69 being moved upward to reduce the internal pressure of the pump chamber 70. A predetermined amount of the fuel in the fuel tank T is thus drawn into the pump chamber 70 through inlet port 75. When the operating rod 68 is then released, the diaphragm 69 is moved downward by the resilient force of the return spring 72 to apply pressure to the interior of the pump chamber 70. This pressure closes the intake valve 78, and opens the discharge valve 79. Accordingly, when the operating rod 68 has been moved fully downward, the valve body 73 engages with the valve seat 74, and the fuel in the pump chamber 70 is discharged via outlet port 77 before the inlet and outlet ports 75, 76 are shut off from each other, and is then injected into the combustion chamber 11.

When the switch 16 is then closed electric current passes through the heating element 49, which soon becomes red-hot to burn the injected fuel.

When the control valve 9 is then drawn up as shown by the chain line, in the same manner as in the embodiment shown in FIGS. 8 and 9, the side passage 6 and fuel nozzle 8 are opened and the air valve 53 is also opened in accordance therewith. When the engine E is thereafter cranked, the fuel F in the float chamber 4 is ejected from the fuel nozzle 8 into the side passage 6 due to the vacuum. In side passage 6 the fuel is mixed with air to produce a gaseous mixture which flows through side passage 6 into the combustion chamber 11 from its upper portion, while air is introduced from the secondary air passage 52 into the secondary air chamber 46. After that, the same operation as in the embodiment shown in FIGS. 8 and 9 is carried out. Therefore, in order to start or warm the cold engine E according to this embodiment, the fuel is injected by the fuel injector 66 into the heating chamber or combustion chamber 11 where it is burnt by the heating element 49. The resulting combustion gas is mixed with the gaseous mixture generated in side passage 6 thus effectively heating the gaseous mixture as a whole. Consequently, a combustible gaseous mixture can be efficiently generated by the small calorific power of the heating element 49.

According to the present invention described above, a side passage by-passing the throttle valve of the carburetor in an internal combustion engine is connected to the intake passage, and a fuel nozzle adapted for ejecting fuel into the side passage and a control valve for opening and closing the side passage are provided in the side passage. Furthermore, a heating element adapted to heat the gaseous mixture generated in the side passage to make a combustible gaseous mixture is installed in a heating chamber formed in the side passage on the downstream side of the control valve so that even when alcohol, which has a high heat of vaporisation and a low vapor pressure, is used as a fuel to start the engine at a low temperature or during the engine warming operation, a combustible gaseous mixture can be reliably generated in the side passage by heating the heating element and opening the control valve. This combustible gaseous mixture is supplied to the engine to promote starting and warming thereof. Moreover, the side passage is not used during normal engine operation, so that the heating element provided in the side passage does not produce intake resistance and the substantial functions of the engine can be fully exhibited.

What is claimed is:

1. A structure for facilitating starting and warming of an internal combustion engine, comprising an intake passage, a carburetor inserted in said intake passage and having a main fuel supply system with a throttle valve therein, and a heating system disposed independently from said main fuel supply system for producing a heated gaseous mixture to be fed into the engine, said heating system including a side passage connected to said intake passage and separate therefrom, by-passing said throttle valve, a fuel nozzle for controlling the fuel in said side passage, a control valve disposed in said side passage for opening and closing said side passage, a heating chamber formed in said side passage on the downstream side of said control valve, and a heating element disposed in said heating chamber for heating a gaseous mixture generated in said side passage, and thereby converting said gaseous mixture into a combustible gaseous mixture, wherein fuel flow in said side passage is independent of fuel flow in said intake passage.

2. A structure according to claim 1, further comprising a heat insulating means inserted between said heating chamber and at least one of said intake passage and said carburetor.

3. A structure according to claim 1, wherein said heating chamber is provided at one end portion thereof with an inlet communicating with an upstream portion of said side passage, and at the other end portion thereof with a plurality of small bores communicating with a downstream portion of said side passage, said heating element extending from said inlet to said small bores.

4. A structure according to claim 1, further comprising a secondary air passage connected to upper and lower portions of said heating chamber, said secondary air passage communicating with the atmosphere at a portion thereof on the upstream side of said throttle valve, said heating element being provided in a lower portion of said heating chamber.

5. A structure according to claim 1 or 4, further comprising a fuel injection means connected to said heating chamber for injecting a predetermined amount of fuel into said heating chamber.

6. A structure according to claim 1, further comprising a catalytic converter means provided in said heating chamber.

7. A structure according to claim 1, wherein said side passage is formed in the body of said carburetor.

* * * * *